United States Patent
Wang

(10) Patent No.: US 7,747,804 B2
(45) Date of Patent: Jun. 29, 2010

(54) METHOD AND SYSTEM FOR SETTING ADDRESSES FOR SLAVE DEVICES IN DATA COMMUNICATION

(75) Inventor: Hung-Jung Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 118 days.

(21) Appl. No.: 12/051,862

(22) Filed: Mar. 20, 2008

(65) Prior Publication Data

US 2009/0177824 A1 Jul. 9, 2009

(30) Foreign Application Priority Data

Jan. 3, 2008 (CN) .................. 2008 1 0300008

(51) Int. Cl.
*G06F 13/18* (2006.01)
(52) U.S. Cl. .................. 710/110; 710/105; 710/106
(58) Field of Classification Search ......... 710/104–117, 710/300–317, 8–12
See application file for complete search history.

(56) References Cited

U.S. PATENT DOCUMENTS

| 5,793,994 | A | * | 8/1998 | Mitchell et al. ............. 710/105 |
| 6,408,334 | B1 | * | 6/2002 | Bassman et al. ............ 709/223 |
| 6,732,206 | B1 | * | 5/2004 | Jensen et al. ................ 710/105 |
| 6,912,607 | B2 | * | 6/2005 | Smith et al. ................. 710/100 |
| 6,921,606 | B2 | * | 7/2005 | Sassa et al. ................... 429/42 |
| 6,963,944 | B1 | * | 11/2005 | Rettig et al. ................ 710/305 |
| 7,246,194 | B2 | * | 7/2007 | Train et al. .................. 710/311 |
| 2004/0054829 | A1 | * | 3/2004 | White et al. ................ 710/105 |
| 2005/0066104 | A1 | * | 3/2005 | Train et al. .................. 710/305 |

OTHER PUBLICATIONS

Springer Berlin Heidelberg, Simple RS485 Network with Microcontrollers, Mar. 30, 2006, pp. 163-172.*

* cited by examiner

*Primary Examiner*—Raymond N Phan
(74) *Attorney, Agent, or Firm*—Frank R. Niranjan

(57) ABSTRACT

A system for setting data communication addresses includes a master device, a plurality of slave devices, and a bus. The master device is connected to the slave devices via the bus. Each of the slave devices includes a control signal pin and an ID_Set Flag. The master device controls the enable status of the control signal pins and the logical values of the slave devices to set addresses for the slave devices.

7 Claims, 3 Drawing Sheets

METHOD AND SYSTEM FOR SETTING ADDRESSES FOR SLAVE DEVICES IN DATA COMMUNICATION

BACKGROUND

1. Field of the Invention

The present invention relates to a method and system for setting addresses in a data communication system.

2. Description of Related Art

In communication circuits, serial interfaces such as RS485 serial interfaces are familiar communication interfaces for data communications between a master device such as a server and a plurality of slave devices such as uninterrupted power supplies (UPS). In communication between the master device and the slave devices, the master device transmits data to a slave device by using an address of the slave device. A slave device receives data corresponding to its own address and transmits response data to the master device. Thus the master device is able to transmit data to a slave device.

A way to set addresses in earlier RS485 control systems uses two rotary address switches to set the address. The two rotary address switches use a decimal format to set the addresses of the slave devices of the RS485 bus control system. When the RS485 bus control system includes several hundred or several thousand slave devices, setting the addresses of the slave devices becomes time consuming, and the possibility of mistakes is great.

What is desired, therefore, is to provide a method and system for setting respective identification numbers for a plurality of slave devices constituting a network.

SUMMARY

An embodiment of a system for setting data communication addresses includes a master device, a plurality of slave devices, and a bus. The master device is connected to the slave devices via the bus. Each of the slave devices includes a control signal pin and an ID_Set Flag. The master device controls the status of the control signal pins and the logical values of the slave devices to set addresses for the slave devices.

Other advantages and novel features of the present invention will become more apparent from the following detailed description of preferred embodiment when taken in conjunction with the accompanying drawings, in which:

DETAILED DESCRIPTION

Figure 1:
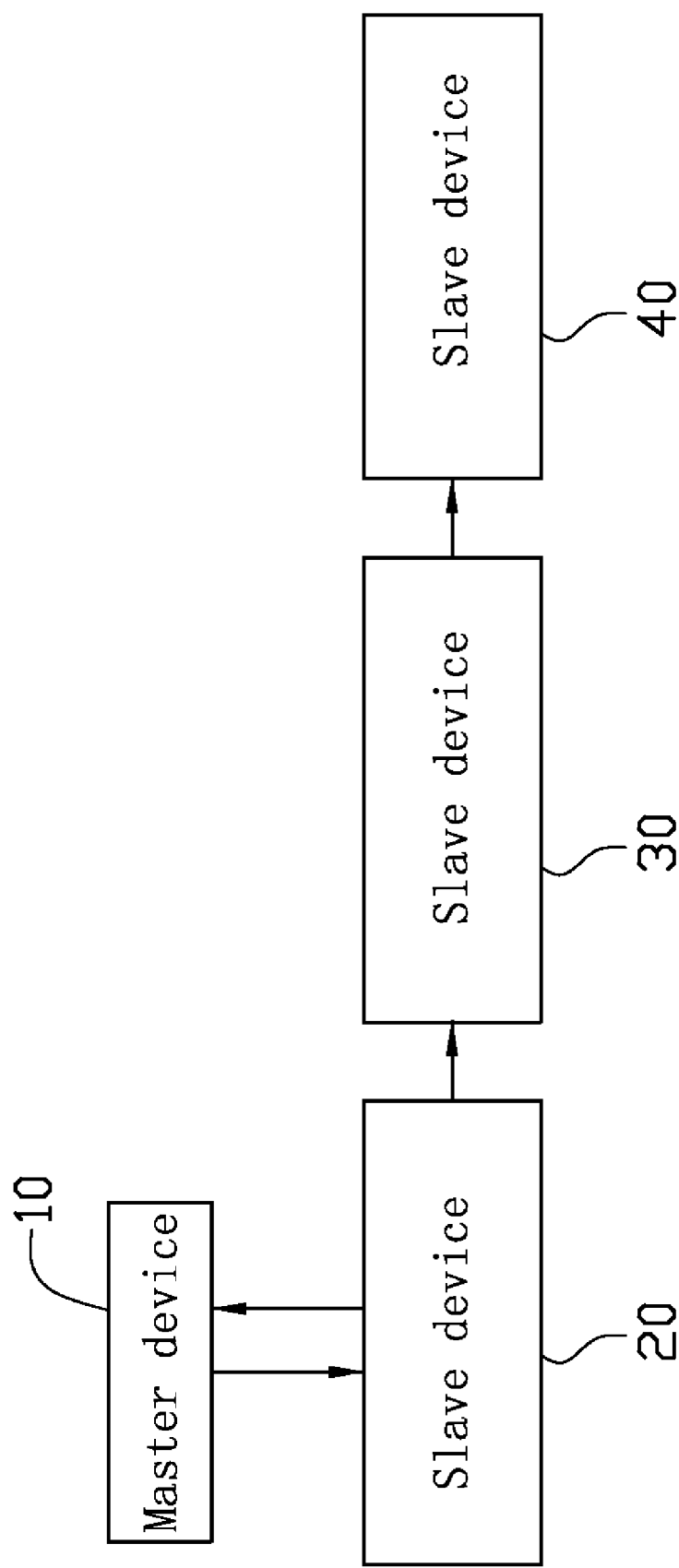
FIG. 1 is a block diagram of a system for setting addresses in accordance with an embodiment of the present invention having a master device, three slave devices, and a bus.

Referring to FIG. 1, a system for setting addresses in accordance with an embodiment of the present invention includes a master device 10 such as a computer system, and a plurality of slave devices such as three slave devices 20, 30, and 40. The master device 10 is connected to the slave devices 20, 30, and 40 via a bus, such as an RS485 bus.

Figure 2:
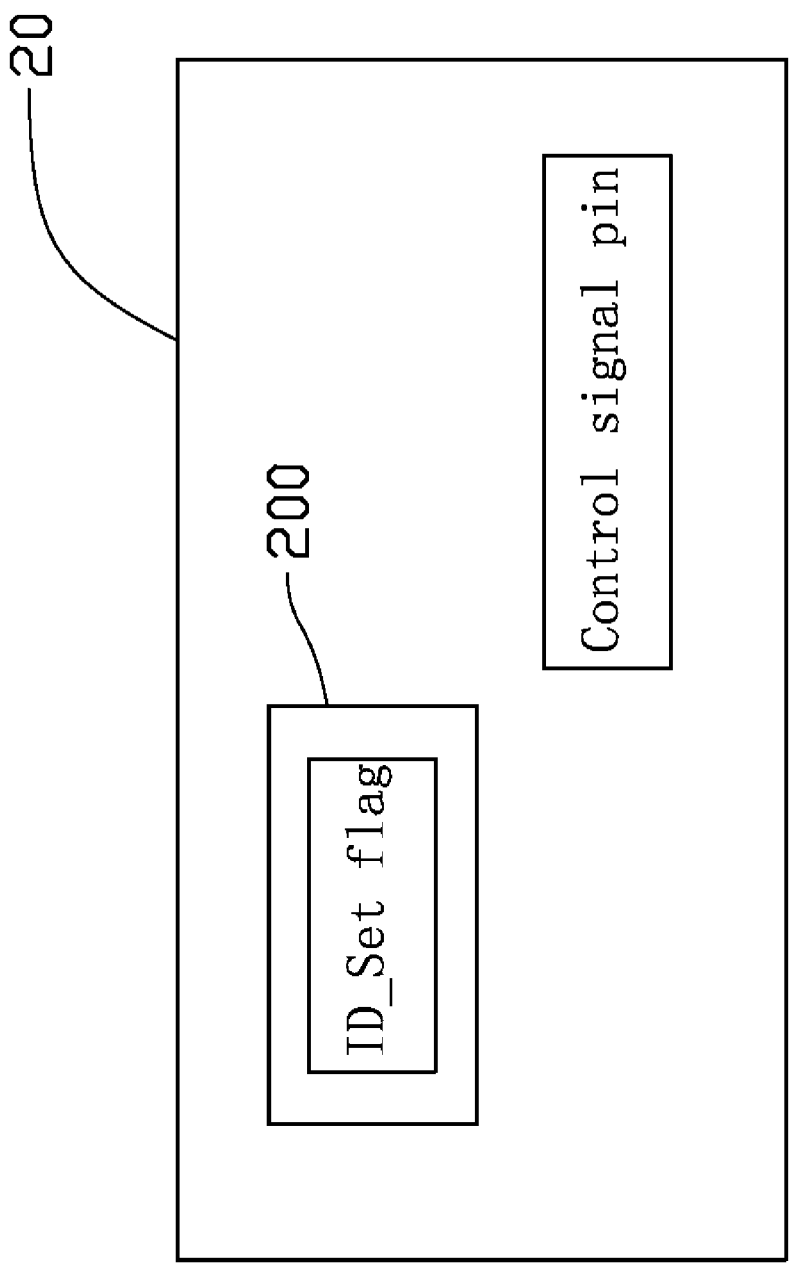
FIG. 2 is a block diagram of one of the slave devices in the system for setting addresses of FIG. 1.

Referring to FIG. 2, each of the slave devices includes a memory unit such as a register 200, and a control signal pin. The register 200 includes an ID_Set Flag. If the status of the control signal pin of one slave device (for example, slave device 20) is "disable", a set ID command from the master device 10 cannot be transferred to the next slave device (i.e., slave device 30) through the slave device 20. If the logical value of the ID_Set Flag of one slave device is "0" or "false", the slave device executes the set ID command from the master device 10. And then the slave device makes the logical value of its ID_Set Flag be "1" or "true", and the status of its control signal pin is set to "enable". If the logical value of the ID_Set Flag of one slave device is "1" or "true", the slave device executes no set ID command from the master device 10.

Figure 3:
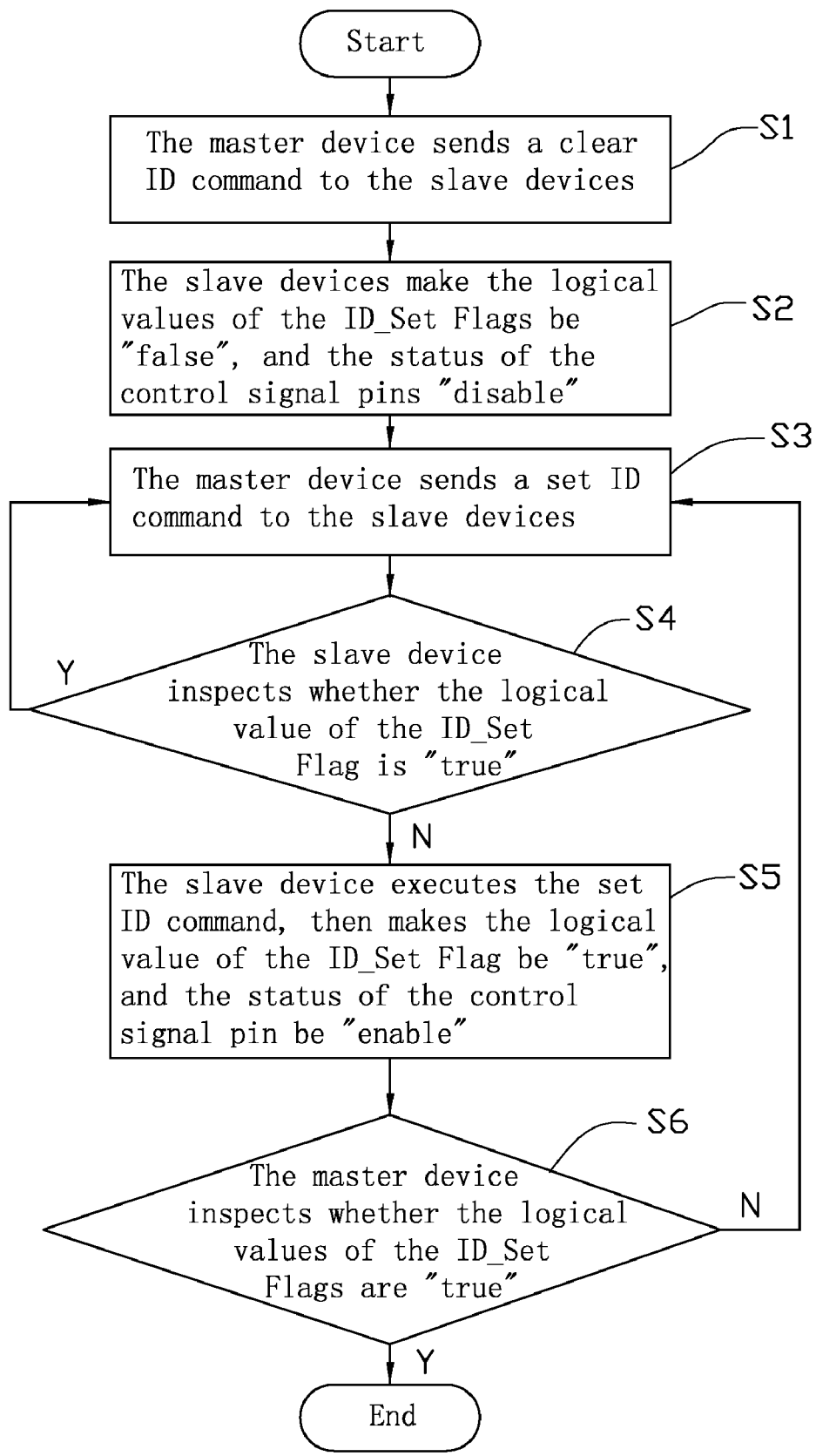
FIG. 3 is a flow chart of a method for setting addresses with the system of FIG. 1.

Referring to FIG. 3, a method of setting addresses with the system in accordance with an embodiment of the present invention includes:

Step S1: the master device 10 sending a clear ID command to the slave devices 20, 30, and 40;

Step S2: the slave devices 20, 30, and 40 setting the logical values of the ID_Set Flags be "false", and the status of the control signal pins "disable";

Step S3: the master device 10 sending a set ID command to the slave devices 20, 30, and 40;

Step S4: the slave devices 20, 30, and 40 checking if the logical value of the ID_Set Flag is "true", if the logical value of the ID_Set Flag is "true", the corresponding slave device does not execute set ID command from the master device 10, and returns to the step S3;

Step S5: if the logical value of the ID_Set Flag is "false", the corresponding slave device executes the set ID command from the master device 10, then sets the logical value of the ID_Set Flag as "true", and the status of the control signal pin as "enable"; and Step S6: the master device 10 checking if the logical values of the ID_Set Flags of all slave devices 20, 30, and 40 are "true", if the logical values are all true, the address setting procedure for the slave devices ends, if the logical value of one of the slave devices 20, 30, and 40 is "false", return to the step S3.

The master device 10 checks if the ID_Set Flag of the slave device is "true". If the ID_Set Flag of the slave device is "false", the slave device has no address. And then the master device 10 sets an address for the slave device. Thus, the system and method for setting addresses is simple and time-saving.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A system for setting data communication addresses comprising:
    a master device;
    a plurality of slave devices, each of the slave devices comprising a control signal pin and an ID_Set Flag; and
    a bus, the master device connected to the slave devices in series via the bus, the master device controlling an enable status of the control signal pin of one of the plurality of slave devices to determine whether a set ID command from the master device is transferred to a next slave device, and controlling a logical value of the ID_Set Flag of said one of the plurality of slave devices to determine whether the slave device executes the set ID command from the master device, thereby setting addresses for the slave devices.

2. The system for setting data communication addresses as claimed in claim 1, wherein the ID_Set Flag is stored in a register.

3. The system for setting data communication addresses as claimed in claim 1, wherein when the status of the control signal pin of one slave device is "disable", the set ID command from the master device is not transferred to the next slave device via the salve device; when the logical value of the ID_Set Flag of the slave device is "true", the slave device does not execute the set ID command from the master device; when the logical value of the ID_Set Flag of the slave device is "false", the slave device executes the set ID command from the master device, and then makes the logical value of the ID_Set Flag be "true", and the status of the control signal pin be "enable".

4. The system for setting data communication addresses as claimed in claim 1, wherein the master device is a computer system.

5. The system for setting data communication addresses as claimed in claim 1, wherein the master device is connected to the slave devices via an RS485 bus.

6. A method for setting data communication addresses of a plurality of slave devices which are connected in series to a master device by a bus, each of the slave devices comprising a control signal pin and an ID_Set Flag, the method comprising:

(i) sending a set ID command from the master device to the slave devices via the bus;

(ii) checking if a logical value of the ID_Set Flag of each of the slave devices is "true", if the logical value of the ID_Set Flag is "true", the corresponding slave device does not execute the set ID command from the master device;

(iii) if the logical value of the ID_Set Flag is "false", the corresponding slave device executes the set ID command from the master device, and then sets the logical value of the ID_Set Flag as "true", and a status of the control signal pin of the corresponding slave device as "enable", the set ID command from the master device is transferred to a next slave device;

(iv) checking if the logical values of the ID_Set Flags of slave devices are "true", if the logical values are all true, the method for setting data communication addresses ends; and (v) if the logical value of one of the slave devices is "false", returning to the step (i).

7. The method for setting addresses as claimed in claim 6, before the step (i) further comprising:

the master device sending a clear ID command to the slave devices; and the slave devices making the logical values of the ID_Set Flags be "false", and the status of the control signal pins be "disable".

* * * * *

UNITED STATES PATENT AND TRADEMARK OFFICE
CERTIFICATE OF CORRECTION

PATENT NO. : 7,747,804 B2
APPLICATION NO. : 12/051862
DATED : June 29, 2010
INVENTOR(S) : Hung-Jung Wang It is certified that error appears in the above-identified patent and that said Letters Patent is hereby corrected as shown below:

Please replace Section (54) regarding "Title" on the front page of the Patent with the following:

(54) METHOD AND SYSTEM FOR SETTING ADDRESSES FOR SLAVE DEVICES IN DATA COMMUNICATION SYSTEM

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,747,804 B2  Page 1 of 1
APPLICATION NO. : 12/051862
DATED : June 29, 2010
INVENTOR(S) : Hung-Jung Wang It is certified that error appears in the above-identified patent and that said Letters Patent is hereby corrected as shown below:

Please replace "Title" on the Title page of the Patent and at Column 1, lines 1-3, with the following:

(54) METHOD AND SYSTEM FOR SETTING ADDRESSES FOR SLAVE DEVICES IN DATA COMMUNICATION SYSTEM

This certificate supersedes the Certificate of Correction issued September 14, 2010.

Signed and Sealed this

Second Day of November, 2010

David J. Kappos
*Director of the United States Patent and Trademark Office*